United States Patent
Hirano (10) Patent No.: US 9,315,216 B2
(45) Date of Patent: Apr. 19, 2016

(54) COWL-TOP COVER

(71) Applicant: NIHON PLAST CO., LTD., Fujinomiya-shi, Shizuoka (JP)

(72) Inventor: Masanori Hirano, Fujinomiya (JP)

(73) Assignee: NIHON PLAST CO., LTD., Shizuoka (JP)

( * ) Notice: Subject to any disclaimer, the term of this patent is extended or adjusted under 35 U.S.C. 154(b) by 0 days.

(21) Appl. No.: 14/478,980

(22) Filed: Sep. 5, 2014

(65) Prior Publication Data

US 2015/0069787 A1    Mar. 12, 2015

(30) Foreign Application Priority Data

Sep. 6, 2013 (JP) ................................. 2013-185110

(51) Int. Cl.
*B60R 21/34* (2011.01)
*B62D 25/08* (2006.01)

(52) U.S. Cl.
CPC .............. *B62D 25/081* (2013.01); *B60R 21/34* (2013.01); *B60R 2021/343* (2013.01)

(58) Field of Classification Search
CPC . B62D 25/081; B60R 21/34; B60R 2021/343
USPC ............................ 296/192, 96.21, 96.22, 208
See application file for complete search history.

(56) References Cited

U.S. PATENT DOCUMENTS

| 8,152,227 B2 * | 4/2012 | Kurata et al. ................. 296/192 |
| 2013/0076071 A1 * | 3/2013 | Morden et al. ................ 296/192 |
| 2013/0214560 A1 * | 8/2013 | Sasaki ............................ 296/192 |
| 2013/0257102 A1 * | 10/2013 | Schaefer et al. .............. 296/192 |

FOREIGN PATENT DOCUMENTS

| JP | 2007-223434 A | 9/2007 |
| JP | 2011-520694 A | 7/2011 |

* cited by examiner

*Primary Examiner* — Jason S Morrow
*Assistant Examiner* — E Turner Hicks
(74) *Attorney, Agent, or Firm* — Arent Fox LLP

(57) ABSTRACT

The present invention provides a cowl-top cover. A cover mounting portion which is provided along a longitudinal direction from one end part in a longitudinal direction of a cover main body portion is inserted into and then engaged with an engagement receptacle portion, whereby the cowl-top cover is caused to be easily mountable to a vehicle body. A low rigidity portion which is provided at one end part in the longitudinal direction of the cover main body portion is deformed so as to space the cover mounting portion in a counter-insertion direction with respect to the engagement receptacle portion, whereby the cover mounting portion is caused to be easily removable from the engagement receptacle portion at a position of one end part in the longitudinal direction of the cover main body portion.

4 Claims, 7 Drawing Sheets

COWL-TOP COVER

CROSS REFERENCE TO RELATED APPLICATIONS

This application claims priority of Japanese Patent Application No. 2013-185110 filed on Sep. 6, 2013. The contents of this application are incorporated herein by reference in their entirety.

BACKGROUND OF THE INVENTION

1. Field of the Invention

The present invention relates to a cowl-top cover provided with a cover main body portion disposed at an edge part of a wind shield, a widthwise direction of a vehicle is defined as a longitudinal direction thereof.

2. Description of the Related Art

Conventionally, there has been employed a cowl-top cover which is disposed at a so called cowl portion between a front end part of a front glass and a rear side part of a bonnet/hood, of a motor vehicle, and which covers this cowl portion to improve its related appearance. Such a cowl-top cover is provided with a plate-shaped cover main body portion configured to cover the cowl portion, a cover mounting portion which is formed at a rear end part of this cover main body portion is mounted so as to sandwich the front end part of a front glass that covers the cowl portion, and a panel placement face portion serving as a vehicle body mounting member which is formed at a front side lower part of the cover main body portion is supported so as to be fixed to a vehicle body panel, and is mounted to a vehicle body. Further, at a front side upper part of the cover main body portion, i.e., at a font end part of a longitudinal wall part which is risen to an upper side, there is provided a hood seal face portion serving as a counterpart member opposite portion which is opposite to the bonnet/hood, and to which an elastically deformable sealing member is mounted, and this face portion comes into intimate contact with a rear end bottom face of the bonnet/hood in a state in which this sealing member is closed, so as to shut out a hot air or an offensive smell from an engine room (for example, reference should be made to Japanese Patent Application Publication No. 2007-223434).

In recent years, there has been a construction in which: an engagement receptacle portion is provided at a front end part of a front glass; a cover mounting portion of a cowl-top cover is formed in a claw shape and then is inserted into the engagement receptacle portion; and the cowl-top cover is disposed in parallel to the front glass. According to this construction, there are advantages that: a cover mounting portion of the cowl-top cover can be provided so as not to overlap on a front glass face; the cowl-top cover can be provided to reduce a step difference with respect to the front glass face or can be formed so as to have no step difference; its related appearance is improved (due to a design effect of a flush surface), a spatial effect can be attained; and a wiper wipeout range can be set from the cowl-top cover (a so called fully concealed wire can be provided in such a manner as to enable the wiper to be disposed under a hood while not in use and to be turned at a predetermined angle from a storage position to a maximum protrusion position) (for example, reference should be made to Japanese Patent Application Publication No. 2011-520694).

In the case of a construction in which a cover mounting portion is inserted into and then fixed to an engagement receptacle portion, it is impossible to mount and remove a cowl-top cover to and from a front glass merely by moving the cover in the forward and backward direction. In particular, at the time of removing the cowl-top cover, there is a need to remove a cover mounting portion, which continuously engages with a front end part of the front glass while deforming the cowl-top cover from a terminal portion in a longitudinal direction.

However, a current cowl-top cover is prone to increase a gap between a bonnet/hood and a vehicle body panel in order to improve a pedestrian protection performance, and in order to compensate for such a gap, there are provided: a protrusion portion configured to protrude to the bonnet/hood's side along a widthwise direction which of a vehicle is a longitudinal direction thereof; and a transverse wall which is positioned at a terminal portion; and therefore, its related rigidity is comparatively high, and it is not easy to set the terminal portion in the longitudinal direction as a start point for deforming and removing the cowl-top cover.

SUMMARY OF THE INVENTION

It is an object of the present invention to provide a cowl-top cover which is caused to be easily mountable to and removable from a vehicle body.

A cowl-top cover according to a first aspect of the present invention comprises a cover main body portion disposed at an edge part of a wind shield, a widthwise direction of a vehicle is defined as a longitudinal direction thereof, the cowl-top cover being provided in such a manner that the cover main body portion includes:

an engagement portion which is disposed along a longitudinal direction from one end part of the cover main body portion in the longitudinal direction, the engagement portion being inserted into and then engaged with an engagement receptacle portion which is disposed at the end part of the wind shield, in a direction crossing a face of the wind shield; and a low rigidity portion which is provided at such one end part of the cover main body portion in the longitudinal direction, the low rigidity portion being caused to be easily deformable so as to space the engagement portion in a counter-insertion direction with respect to the engagement receptacle portion.

The cowl-top cover according to a second aspect of the present invention is provided in such a manner that the cover main body portion comprises a protrusion portion which is provided in proximity to the engagement portion at least at one end part in the longitudinal direction, the protrusion portion being configured to protrude to an upper side, and is divided into a plurality of divisional members, the plurality of divisional members comprises a first divisional member and a second divisional member, the first divisional member has an opening portion which is formed by cutting out at least the protrusion portion at such one end part of the cover main body portion in a longitudinal direction, and constitutes at least a part of a remaining portion of the engagement portion and the protrusion portion, and the second divisional member is mounted to the opening portion to thereby constitute at least a part of the protrusion portion.

The cowl-top cover according to a third aspect of the present invention is provided in such a manner that the second divisional member is detachable from the opening portion of the first divisional member.

The cowl-top cover according to a fourth aspect of the present invention is provided in such a manner that the second divisional member is made of a member which is softer in material than the first divisional member.

In so far as the cowl-top cover according to the first aspect of the present invention is concerned, an engagement portion provided along a longitudinal direction from one end part in a longitudinal direction of a cover main body portion is inserted into and then engaged with an engagement receptacle portion which is disposed at an edge part of a wind shield in a direction crossing a face of this wind shield. In this manner, the cowl-top cover is caused to be easily mountable to a vehicle body. In addition, by way of a low rigidity portion which is provided at one end part in the longitudinal direction of the cover main body portion, the engagement portion is caused to be easily deformable from the engagement receptacle portion at such one end part in the longitudinal direction of the cover main body portion. Therefore, while the engagement portion that is removed from such one end part in the longitudinal direction of this cover main body portion is defined as a start point, this engagement portion is caused to be continuously removable from the engagement receptacle portion along the longitudinal direction of the cover main body portion, and the cowl-top cover is caused to be easily removable from the vehicle body.

In so far as the cowl-top cover according to the second aspect of the present invention is concerned, among a plurality of divisional members configured to divide a main body portion into a plurality of sections, an opening portion formed by cutting out a protrusion portion at one end part in a longitudinal direction is provided at one divisional member (a first divisional member). Thus, the other divisional member (a second divisional member) that is mounted to this opening portion is caused to be easily deformable and removable from the opening portion, whereby a position in proximity to the opening portion of such one divisional member can be determined as a low rigidity portion which is easily deformable. In this manner, by way of this low rigidity portion, the engagement portion of such one divisional member is caused to be easily deformable so as to space the engagement portion of such one divisional member in a counter-insertion direction with respect to the engagement receptacle portion, the engagement portion is caused to be easily removable from the engagement receptacle portion, and the cowl-top cover is caused to be more easily removable from the vehicle body.

In so far as the cowl-top cover according to the third aspect of the present invention is concerned, the other divisional member (the second divisional member) is detachable from an opening portion of such one divisional member (the first divisional member). Thus, the other divisional member is removed from an opening portion, whereby a position in proximity to an opening portion of such one divisional member can be determined as a low rigidity portion which is easily deformable. In this manner, by way of this low rigidity portion, an engagement portion of such one divisional member is caused to be easily deformable so as to space an engagement portion of such one divisional member in a counter-insertion direction with respect to the engagement receptacle portion, the engagement portion is caused to be easily removable from the engagement receptacle portion, and the cowl-top cover is caused to be more easily removable from the vehicle body.

In so far as the cowl-top cover according to the fourth aspect of the present invention is concerned, the other divisional member (the second divisional member) is formed of a member which is softer in material than such one divisional member (the first divisional member); and therefore, a low rigidity portion can be easily constructed at a position in proximity to an opening portion.

BRIEF DESCRIPTION OF THE DRAWINGS

FIG. 1 shows a part of a first embodiment of a cowl-top cover of the present invention, wherein FIG. 1(a) is a perspective view thereof, and FIG. 1(b) is an enlarged sectional view of an equivalent portion taken along the line I-I of FIG. 1(a);

FIG. 6 shows a second embodiment of the cowl-top cover of the present invention, wherein FIG. 6(a) is a perspective view showing a part of the cowl-top cover, and FIG. 6(b) is a sectional view showing a part of a state in which an auxiliary member is mounted to a main body member; and FIG. 7 is an explanatory view schematically depicting a third embodiment of the cowl-top cover of the present invention, wherein FIG. 7(a) shows a state in which the cowl-top cover is mounted, and FIG. 7(b) shows a state in which the cowl-top cover is removed.

DESCRIPTION OF THE PREFERRED EMBODIMENTS

Hereinafter, embodiments of a cowl-top cover according to the present invention will be described with reference to the drawings.

First Embodiment

In FIG. 1 to FIG. 5, reference numeral 10 designates a vehicle body of a motor vehicle which is a vehicle, and in so far as this vehicle body 10 is concerned, a hood 12 serving as a counterpart member configured to cover an engine room 11; and a cowl-top cover 16 configured to cover a cowl portion 15 with respect to a front glass 14 serving as a wind shield which is positioned on a front side of a vehicle room 13, are mounted to the vehicle 10. Hereinafter, it is to be noted that, with respect to forward and backward, vertical, and lateral directions, a description will be given with respect to a cruising direction of the vehicle body 10, the direction indicated by the arrow F is defined as a forward direction, the direction indicated by the arrow U is defined as an upward direction, and the direction indicated by the arrow W is defined as a widthwise direction of a vehicle 10 which is a transverse direction.

Also, this cowl portion 15 is referred to as an air box or the like as well, and for example, is formed in a tub shape with an opened top side, of: a cowl-top panel, although not shown, which is formed on an iron plate; and a vehicle body panel 22 serving as a vehicle body member which is formed on the iron plate and which constitutes a vehicle body. Also, at an upper side part of the cowl-top panel, the front glass 14 is fixed to the cowl-top panel. In addition, the vehicle body panel 22 is referred to as an extension panel or the like as well; and there are provided: a bottom plate portion, although not shown, in which a rear side part is secured to the cowl-top panel; a front plate portion 25 in which a front side part of this bottom plate portion is risen to a front upper side; and a support plate portion 26 serving as vehicle body side support portion in which an upper end part of this front plate portion 25 is extensively provided so as to be substantially horizontal on a front side. Also, to this cowl portion 15, an air intake portion of an air conditioning apparatus, although not shown, which is configured to introduce ambient air into the vehicle room 13, is connected, and on the right side which is one side of this cowl portion 15, a motor or the like configured to drive a wiper arm of a wiper, although not shown, is disposed.

In addition, the hood 12 is obtained as a bonnet/hood which is positioned at a front part of the vehicle body 10, the bonnet/hood being configured to openably cover the engine room 11; and a hood outer portion which is positioned outside, that is, at an upper side in a closed state, and a hood inner portion which is positioned inside of this hood outer portion, that is, on a lower side in a closed state via slight intervals, are formed integrally or separately.

Further, all over a front edge part which is opposite to a rear end part of the cowl-top cover 16 of the front glass 14, for example, an engagement member 28 which is formed of a synthetic resin or the like is integrally mounted, and at this engagement member 28, an engagement receptacle portion 29 for mounting and retaining the cowl-top cover 16 is formed. This engagement receptacle portion 29 is formed as a recessed groove which opens to an upper side, and is disposed in a longitudinal manner in a widthwise direction of a vehicle 10 so as to be continuous all over the front edge part of the front glass 14. In addition, at upper and lower edge parts of this engagement receptacle portion 29, claw-shaped engagement protrusions 29a, 29b are respectively protrusively provided.

Also, the cowl-top cover 16 is referred to as a cowl cover or the like as well, and is formed in the shape of an elongated substantial plate while the transverse direction, that is, the widthwise direction of the vehicle 10 is defined as a longitudinal direction along the cowl portion 15 so as to improve its related appearance while covering the cowl portion 15, that is, an upper side of the vehicle body panel 22. In addition, a planar shape of this cowl-top cover 16 is gently curved so that a center portion protrudes to a front side.

This cowl-top cover 16 is provided with a plate-shaped cover main body portion 30 which is disposed so as to communicate with a front edge part of the front glass 14 while the widthwise direction of the vehicle 10 is defined as a longitudinal direction thereof. Also, in so far as a cross-sectional shape of this cover main body portion 30 is concerned, basically, a vehicle body mounting portion 32 which is provided with a main body portion 31, and which is also a panel placement face portion supported by supporting plate portion 26 at a front end part which is a tip end part of this main body portion 31 is continuously provided, and a cover mounting portion 33 serving as an engagement portion which is inserted into and then engaged with an engagement receptacle portion 29 at a front edge part of the front glass 14 is continuously provided at a rear end part which is a proximal end part of the main body portion 31, and is configured to cover a cowl portion 15 between the front edge part of the front glass 14 and the support plate portion 26 so as to define a gap between the support plate portion 26 and a hood 12 which is opposite to an upper side of this support plate portion 26, that is, a space between the engine room 11 and the cowl portion 15. In addition, the cover main body portion 30 of this cowl-top cover 16 is divided into a plurality of divisional members which are separated from each other, and in the embodiment, this cover main body portion is divided into: a main body member 35 serving as one divisional member; and an auxiliary member 36 serving as the other divisional member.

Also, the main body portion 31 is in a shape which is formed toward the side of the front glass 14, is a general face which can also be referred to as a continuous wall, and takes an appropriate shape according to the shape of the engine room 11 or the hood 12 and the layout of a wire; and however, in the embodiment, basically, this main body portion is integrally provided with: a flat plate portion 41 which is inclined in substantial parallel to the front glass 14, and which is caused to be continuous in a longitudinal direction while the widthwise direction of the vehicle 10 is defined as the longitudinal direction thereof; and a reverse V-shaped portion 42 which serves as a protrusion portion configured to protrude to an upper side from this flat plate portion 41, that is, toward the hood 12, and which is caused to be continuous along the longitudinal direction.

In the plate portion 41, there are formed: a plurality of, for example, one and the other wiper pivot hole portions 46, 47 which are two circular hole portions to be passed through by a grid-shaped air intake opening 45 referred to as an air intake such as a grid shape capable of introducing ambient air into the cowl portion 15 or a wiper shaft.

One wiper pivot hole portion 46 is opened in the plate portion 41 at one end part in the longitudinal direction of the main body portion 31. In addition, the other wiper pivot hole portion 47 is opened in the plate portion 41 at a position which is more proximal to one end part than that of a center part in the longitudinal direction of the main body portion 31.

The reverse V-shaped portion 42 is integrally provided with: a protrusion portion main body 51 which is caused to be continuous along the longitudinal direction of the cowl-top cover 16 (the cover main body portion 30), and which extends in a longitudinal manner; and (one and the other) transverse wall portions 52, 52 which are continuous at both end parts of this protrusion portion main body 51, and which are bent to a rear side. Also, this reverse V-shaped portion 42 has a function of reinforcing the cowl-top cover 16.

The protrusion portion main body 51 is integrally provided with: a rear part longitudinal wall portion 55 which is risen in an inclined manner from a front end part to a front upper side of the plate portion 41; an upper wall portion 56 which extends from an upper end part to a front side of this rear part longitudinal wall portion 55; and a front part longitudinal wall portion 57 which is lowered in an inclined manner from a front end part to a front lower side of this upper wall portion 56.

The rear part longitudinal wall portion 55 is configured to disable entry of a foreign matter such as snow, for example, into the engine room 11, and is formed in the shape of a flat plate configured to protrude to an upper side in a direction which is substantially orthogonal to the front end part of the plate portion 41.

The upper wall portion 56 is integrally provide with: a rear part upper wall portion 61 configured to protrude forward in a direction which is substantially orthogonal to an upper end part of the rear part longitudinal wall portion 55; and a hood seal face portion 62 which is a counterpart opposite portion (a hood opposite portion) serving as a front part upper wall portion which is bent forward at an obtuse angle with respect to the front end part of this rear part upper wall portion 61.

The rear part upper wall portion 61 is formed in the shape of a flat plate which is gradually inclined to a front lower side in a state in which the cowl-top cover 16 is mounted to the vehicle body 10. It is to be noted that this rear part upper wall portion 61 is formed at a position excluding a front position of a respective one of the wiper pivot hole portions 46, 47, and from the front position of a respective one of these wiper pivot hole portions 46, 47, this upper wall portion is formed so as to gradually widen in the forward and backward direction toward the other end part in the longitudinal direction of the cowl-top cover 16 (the cover main body portion 30).

The hood seal face portion 62 is referred to as a seal mounting portion or a hood seal mounting portion or the like as well; is opposite to a rear part bottom face of the hood 12; and is formed in the shape of a flat plate which is protrusively provided in a horizontal manner from the front end part to the front side of the rear part upper wall portion 61. Also, at an upper part of this hood seal face portion 62, a hood seal 64 serving as an elastically deformable seal member is disposed by way of adhesive bonding or engagement or the like from an upper side. In addition, this hood seal 64 is formed in a rubber-based or thermoplastic elastomer-based cylindrical shape, for example, and comes into liquid contact with the hood 12 in its closed state so as to shut out a hot air or an offensive smell from the engine room 11.

The front part longitudinal wall portion 57 is formed in the shape of a flat plate configured to protrude to a lower side in a direction which is substantially orthogonal to a tip end part of the hood seal face portion 62 which is a front end part of the upper wall portion 56, and a lower end part of the wall portion is caused to be continuous to a vehicle body mounting portion 32.

Transverse wall portions 52, 52 are formed along the forward and backward direction at positions of both end parts in the longitudinal direction of the cowl-top cover 16 (the cover main body portion 30), and protrudes to an upper side with respect to the plate portion 41. Also, these transverse wall portions 52, 52 are respectively integrally provided with: side part longitudinal wall portions 66, 66 which are respectively continuous to both end parts in the longitudinal direction of the rear part longitudinal wall portion 55 of the protrusion portion main body 51; rear wall portions 67, 67 which are respectively continuous to rear end parts of these side part longitudinal wall portions 66, 66; and side part upper wall portions 68, 68 which are respectively continuous to upper end parts of these side part longitudinal wall portions 66, 66 and rear wall portions 67, 67.

A respective one of the side part longitudinal wall portions 66 is formed on a rear side along the forward and backward direction that is a direction substantially orthogonal to the rear part longitudinal wall portion 55 and the plate portion 41. Also, at a position in proximity to a corner portion at which one side part longitudinal wall portion 66 and the rear part longitudinal wall portion 55 are continuous to each other, one wiper pivot hole portion 46 is opened in the plate portion 41.

A respective one of the rear wall portions 67 is formed in the shape of a flat plate extending along the longitudinal direction of the cowl-top cover 16 (the cover main body portion 30) that is a direction substantially orthogonal to the side part longitudinal wall portion 66 and the plate portion 41, and extends to each end part in the longitudinal direction of the cowl-top cover 16 (the cover main body portion 30). Also, the respective one of the rear wall portions 67 is disposed at a position which is spaced from the cover mounting portion 33 to a front side.

A respective one of the side part upper wall portions 68 is formed in the shape of a flat plate which is caused to be continuous from an upper end part of the respective one of the side part upper wall portions 66 all over an upper end part of the respective one of the rear wall portions 67, and which extends to a front side. That is, the respective one of the side part upper wall portions 68 is bent in an L-shape when it is seen from an upper side. Also, these side part upper wall portions 66 are respectively continuous to both end parts in the longitudinal direction of the upper wall portion 56.

The vehicle body mounting portion 32 can be referred to as a fixing portion as well, extends to a front side, and is formed in the shape of a substantially horizontal plate which is placed and supported on the support plate portion 26; and further, mounting portions, although not shown, such as a plurality of mounting holes formed at predetermined positions, are fixed to the support plate portion 26 of the vehicle body panel 22 by employing mounting brackets such as rivets inserted into a mounting receptacle portion, although not shown, of the support plate portion 26. In addition, as required, a seal material is disposed between the vehicle body mounting portion 32 and the support plate portion 26 so as to shut out a noise vibration, a hot air, and an offensive smell from the engine room 11.

The cover mounting portion 33 is obtained as a protrusion portion referred to as a glass alignment portion, a wind shield abutment portion, or a wind shield mounting portion or the like as well, and protrudes to a lower side with respect to a rear part (a bottom face side) of the plate portion 41; and a tip end part 33a inflates in the forward and backward direction with respect to a flat proximal end part 33b. Also, in so far as this cover mounting portion 33 is concerned, the cowl-top cover 16 is pushed to a lower side which is a predetermined direction crossing a front glass face while the cover is applied to an engagement receptacle portion 29 at a front end part of the front glass 14, whereby the tip end part 33a is engaged with a gap between engagement protrusions 29a, 29b so as to be mounted along the front end part of the front glass 14. In this state, the front glass 14, the engagement member 29, and the plate portion 41, of the main body portion 31 are substantially flush with each other.

In addition, the main body member 35 is obtained as a large scale member which constitutes a major part of the cover main body portion 30 of the cowl-top cover 16; and a hard thermoplastic resin such as polypropylene (PP) or acrylonitrile/butadiene/styrene copolymer (ABS), or polyamide-based synthetic resin is injection-molded by employing a die, and the resin thus injection-molded is formed as an integrally formed elongated resin-molded article. This main body member 35 constitutes a respective one of the entireties of the vehicle body mounting portion 32 and the cover mounting portion 33, and is provided with a main cover main body portion 72 constituting a major part of the main body portion 31 other than an opening portion 71 which is cut out and formed in the reverse V-shaped portion 42 at one end part in the longitudinal direction, that is, in proximity to the wiper pivot hole portion 46.

The opening portion 71 serves as a divisional line configured to divide the main body member 35 and the auxiliary member 36 into two sections, and is cut out and formed in a longitudinal manner in the forward and backward direction over a part of the protrusion portion main body 51 of the reverse V-shaped portion 42 and a part of one transverse wall portion 52 at a position of one end part in the longitudinal direction of the main body member 35. In more detail, this opening portion 71 is opened over: an upper part and upper wall portion 56 of the rear part longitudinal wall portion 55 and the protrusion portion main body 51; and an upper part of a respective one of the side part longitudinal wall portion 66 and rear wall portion 67 of one transverse wall portion 52, and communicates with one end part in the longitudinal direction of the cowl-top cover 16 (the cover main body portion 30). Therefore, one end part in the longitudinal direction of the main body member 35, which forms an end part of this opening portion 71, is formed in a substantial L-shape along a position all over the front edge part and the side edge part of one wiper pivot hole portion 46, when it is seen from an upper side.

The main cover main body portion 72 is constructed in such a manner that the main body portion 31 is cut out by the opening portion 71. That is, this main cover main body portion 72 is provided with: a plate portion 41; a main rear part longitudinal wall portion 75 which constitutes a part of the rear part longitudinal wall portion 55 of the protrusion portion main body 51 of the reverse V-shaped portion 42; a main upper wall portion 76 which constitutes a part of the upper wall portion 56; a front part longitudinal wall portion 57; a main side part longitudinal wall portion 77 which constitutes a part of the side part longitudinal wall portion 66 of one transverse wall portion 52; a main rear wall portion 78 which constitutes a part of the rear wall portion 67; a vehicle mounting portion 32; and a cover mounting portion 33. Also, at this cover main body portion 72, a mounting portion 79 for mounting and fixing the auxiliary member 36 while being exposed to the opening portion 71 is formed, and an engagingly locking portion 80 for engagingly locking the auxiliary member 36 is protrusively provided.

The main rear part longitudinal wall portion 75 is constructed in such a manner that one end part in the longitudinal direction of the rear part longitudinal wall portion 55 is cut out by the opening portion 71 at a position of an upper part which is spaced from the plate portion 41.

The main upper wall portion 76 is constructed in such a manner that one end part in the longitudinal direction of the upper wall portion 56 is cut out by the opening portion 71, and is integrally provided with: a rear part upper wall portion 61; and a main hood seal face portion 82 which constitutes a part of the hood seal face portion 62.

The main hood seal face portion 82 is constructed in such a manner that one end part in the longitudinal direction of the hood seal face portion 62 is cut out by the opening portion 71.

The main side part longitudinal wall portion 77 is constructed in such a manner that the side part longitudinal wall portion 66 is cut out by the opening portion 71 at a position of an upper part which is spaced from the plate portion 41.

The main rear wall portion 78 is constructed in such a manner that the rear wall portion 67 is cut out and formed by the opening portion 71 at a position of an upper part which is spaced from the plate portion 41.

As a result, in so far as the main body member 35 is concerned, a region on a rear side of the opening portion 71, that is, portions such as one end part in the longitudinal direction of the plate portion 41 including one wiper pivot hole portion 46, one end part in the longitudinal direction of the cover mounting portion 33 that is positioned at a bottom face side of this plate portion 41 or the main rear part longitudinal wall portion 75 and the main side part longitudinal wall portion 77 each are obtained as a low rigidity portions 84 in which the reverse V-shaped portion 42 does not exist, and which is relatively low in rigidity in comparison with a peripheral portion, that is, which is caused to be easily deformable in a vertical direction crossing a thickness direction.

The mounting portion 79 is constructed in such a manner that a mounting hole 88 configured to fix the auxiliary member 36 via a fixing member such as a rivet, although not shown, is opened at a position of one end part in the longitudinal direction of a respective one of the main rear part longitudinal wall portion 75, the main upper wall portion 76, and the front part longitudinal wall portion 57.

The engagingly locking portion 80 is provided with a plurality of tongue-shaped engagingly locking protrusion portions 91 which are respectively protrusively provided to an upper side from lower edge parts of the opening portions 71 the main rear part longitudinal wall portion 75, the main side part longitudinal wall portion 77, and the main rear wall portion 78. These engagingly locking protrusion portions 91 are inserted into the auxiliary member 36 from a lower side, whereby the auxiliary member 36 is engagingly locked and positioned with respect to the main body member 35.

On the other hand, the auxiliary member 36 is obtained as a small scale member (a member which is equivalently smaller than the main body member 35) which constitutes a remaining portion other than the main body member 35 of the cover main body portion 30 of the cowl-top cover 16, and is integrally provided with: a subsidiary cover main body portion 94 which constitutes a portion excluding the main cover main body portion 72 from the main body portion 31; an overlap plate portion 95 serving as a protrusion plate portion configured to protrude to a lower part of this subsidiary cover main body portion 94; and a mounting plate portion 96 serving as a fixing plate portion configured to protrude to a side part of the subsidiary cover main body portion 94, so as to constitute an entirety of the cowl-top cover 16 (the cover main body portion 30) together with the main body member 35 while closing the opening portion 71. It is to be noted that, in the embodiment, in so far as the auxiliary member 76 is concerned, as is the case with the main body member 35, a hard thermoplastic resin such as polypropylene (PP) or acrylonitrile/butadiene/styrene copolymer (ABS), or alternatively, polyamide-based synthetic resin is injection-molded by employing a die, and the resin thus injection-molded is formed as an integrally formed elongated resin-molded article.

The subsidiary cover main body portion 94 is obtained as a portion which forms a portion excluding the main cover main body portion 72 from the main body portion 31, in other words, a portion on one end side in the longitudinal direction more than one wiper pivot hole portion 46 of the main body portion 31, and is caused to be continuous to the main cover main body portion 72 in a state in which the auxiliary member 36 is mounted to the opening portion 71, thereby constituting the main body portion 31. That is, this subsidiary cover main body portion 94 is provided with: a subsidiary hood seal face portion 98 which constitutes a part of an upper side of the rear part longitudinal wall portion 55 of the protrusion portion main body 51 of the reverse V-shaped portion 42; a subsidiary seal face portion 99 which constitutes a part of an upper side of the hood seal face portion 62 of the upper wall portion 56; a subsidiary side part longitudinal wall portion 100 which constitutes a part of an upper side of the side part longitudinal wall portion 66 of one transverse wall portion 52; and a subsidiary rear wall portion 101, which constitutes a part of an upper side of the rear wall portion 67, and one side part longitudinal upper wall portion 68. In addition, this subsidiary cover main body portion is formed in a L-shape as a whole when it is seen from an upper side. Also, an upper side portion of one end part in the longitudinal direction of the protrusion portion main body 51 of the reverse V-shaped portion 42 is constructed with the subsidiary rear part longitudinal wall portion 98 and the subsidiary hood seal face portion 99, and an upper side portion of one transverse wall portion 52 of the reverse V-shaped portion 42 is constructed with the subsidiary side part longitudinal wall portion 100 and the subsidiary rear wall portion 101.

The subsidiary rear part longitudinal wall portion 98 is obtained as a portion excluding the main rear part longitudinal wall portion 75 from the rear part longitudinal wall portion 55, and is caused to be continuous to the main rear part longitudinal wall portion 75 in a state in which the auxiliary member 36 is mounted to the opening portion 71, thereby constituting the rear part longitudinal wall portion 55. That is, this subsidiary rear part longitudinal wall portion 98 is formed in the shape of a flat plate along the vertical direction.

The subsidiary hood seal face portion 99 is obtained as a portion excluding the main upper wall portion 76 from the upper wall portion 56, and is caused to be continuous to the main upper wall portion 76 in a state in which the auxiliary member 36 is mounted to the opening portion 71, thereby constituting the upper wall portion 56. That is, this subsidiary hood seal face portion 99 is formed in the shape of a flat plate configured to protrude in a horizontal manner from an upper end part to a front side of the subsidiary rear part longitudinal wall portion 98, and is caused to be continuous to one side part upper wall portion 68.

The subsidiary side part longitudinal wall portion 100 is obtained as a portion excluding the main side part longitudinal wall portion 77 from the side part longitudinal wall portion 66, and is caused to be continuous to the main side part longitudinal wall portion 77 in a state in which the auxiliary member 36 is mounted to the opening portion 71, thereby constituting the side part longitudinal wall portion 66. That is, this subsidiary side part longitudinal wall portion 100 is caused to be continuous to one end part of the subsidiary part longitudinal wall portion 98, and is formed in the shape of a flat plate along the vertical direction and the forward and backward direction, and an upper end part of the wall portion is caused to continuous to one side part upper wall portion 68.

The subsidiary rear wall portion 101 is obtained as a portion excluding the main rear wall portion 78 from the rear wall portion 67, and is caused to be continuous to the main rear wall portion 78 in a state in which the auxiliary member 36 is mounted to the opening portion 71, thereby constituting the rear wall portion 67. That is, this subsidiary rear wall portion 101 is formed in the shape of a flat plate which is continuous in the longitudinal direction of the cowl-top cover 16 (the cover main body portion 30) with respect to a rear end part of the subsidiary side part longitudinal wall portion 100, and an upper end part of the wall portion is caused to be continuous to one side part upper wall portion 68.

The overlap plate portion 95 is formed in the shape of a plate which is curved all over lower end parts of the subsidiary rear part longitudinal wall portion 98 and the subsidiary side part longitudinal wall portion 100 of the subsidiary cover main body portion 94, and is offset to a front side with respect to these rear part longitudinal wall portion 98 and subsidiary side part longitudinal wall portion 100. Also, between this overlap plate portion 95 and the lower end part of the subsidiary cover main body portion 94, engagingly locking receptacle portions, although not shown, which the engaging locking protrusion portions 91 of the main body member 35 are to be respectively inserted into and engagingly locked with, are provided in a recessed manner.

The mounting plate portion 96 is formed in a substantially rectangular shape. Also, in this mounting plate portion 96, mounting hole portions 105 each corresponding to a respective one of the respective mounting holes 88 of the main body member 35 are opened.

In addition, in so far as the cowl-top cover 16 is concerned, the auxiliary member 36 is mounted to the opening portion 71 of the main body member 35, whereby the cover main body portion 30 is constructed. Specifically, an engagingly locking receptacle portion of the auxiliary member 36 is aligned to a respective one of the engagingly locking protrusion portions 91 of the main body member 35 and then the auxiliary member 36 is pushed to the side of the main body member 35, whereby the respective one of the engagingly locking protrusion portions 91 is inserted into the engagingly locking receptacle portion, the auxiliary member 36 is engagingly locked to the main body member 35, and the opening portion 71 is closed. In this state, the mounting hole portions 105 that is provided in the mounting plate portion 96 of the auxiliary member 36 and the respective mounting holes 88 of the mounting portion 79 of the main body member 35 are aligned so as to communicate with each other, and the overlap plate portion 95 of the auxiliary member 36 is overlapped on rear face sides of the main rear part longitudinal wall portion 75, the main side part longitudinal wall portion 77, and the main rear wall portion 78 of the main body member 35. In addition, a fixing member is inserted and fixed via the mounting hole portion 105 through a respective one of the mounting holes 88, whereby the auxiliary member 36 is fixed to the main body member 35. As a result, a top face side which is a surface side of the main cover main body portion 72 and a top face side which is a surface side of the subsidiary cover main body portion 94 are substantially flush with each other; the main rear part longitudinal wall portion 75 and the subsidiary rear part longitudinal wall portion 98 are coupled to each other, the rear part longitudinal wall portion 55 is caused to be continuous in the widthwise direction of the vehicle 10; and a main hood seal face portion 82 and a subsidiary hood seal face portion 99 are coupled to each other so that a top face side which is a surface side of the main hood seal face portion 82 and a top face side which is a surface side of the subsidiary hood seal face portion 99 are substantially flush with each other, and then, the hood seal face portion 62 is caused to be continuous in the widthwise direction of the vehicle 10. That is, the main body member 35 and the auxiliary member 36 are integrally coupled to each other.

Figure 1:
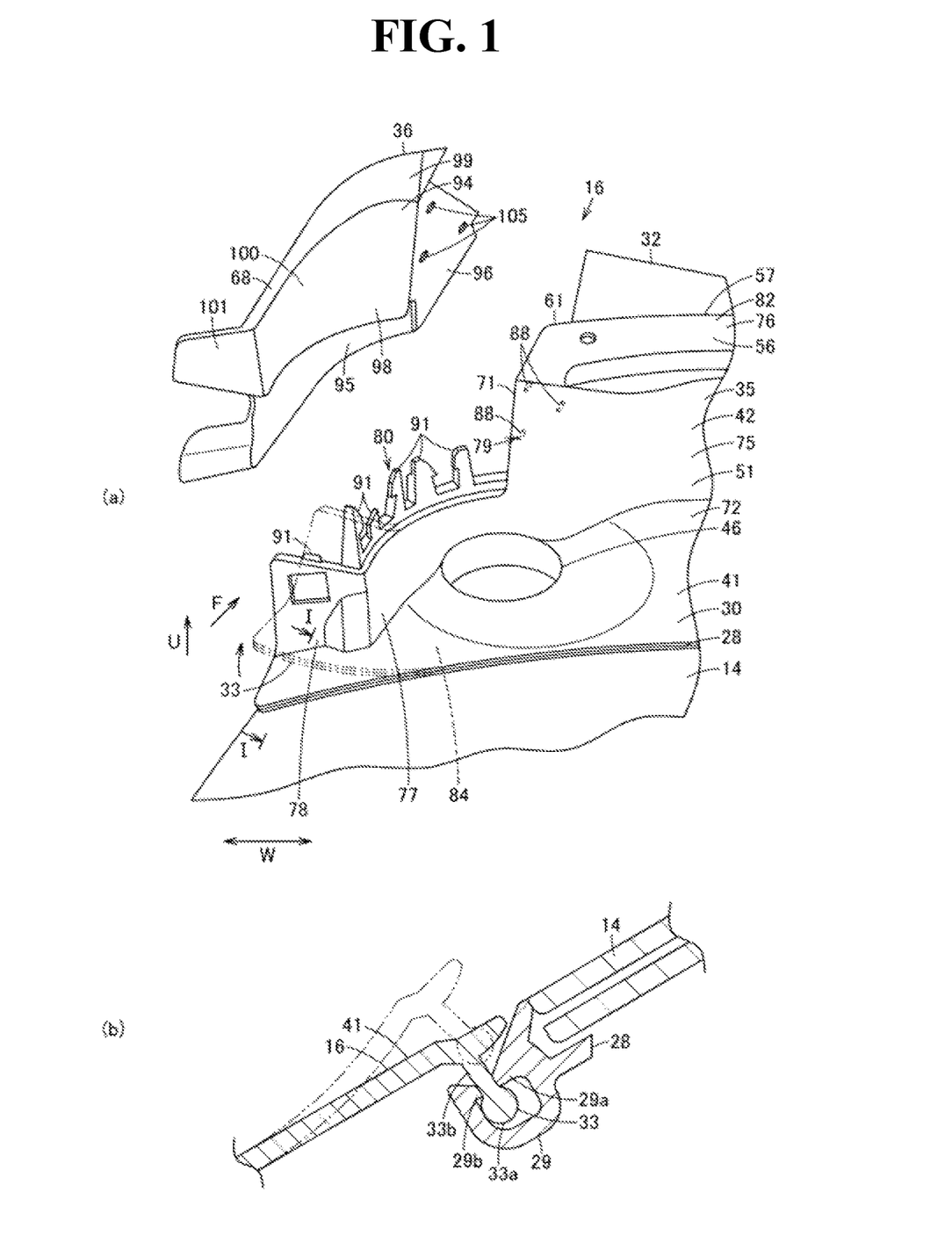
Figure 2:
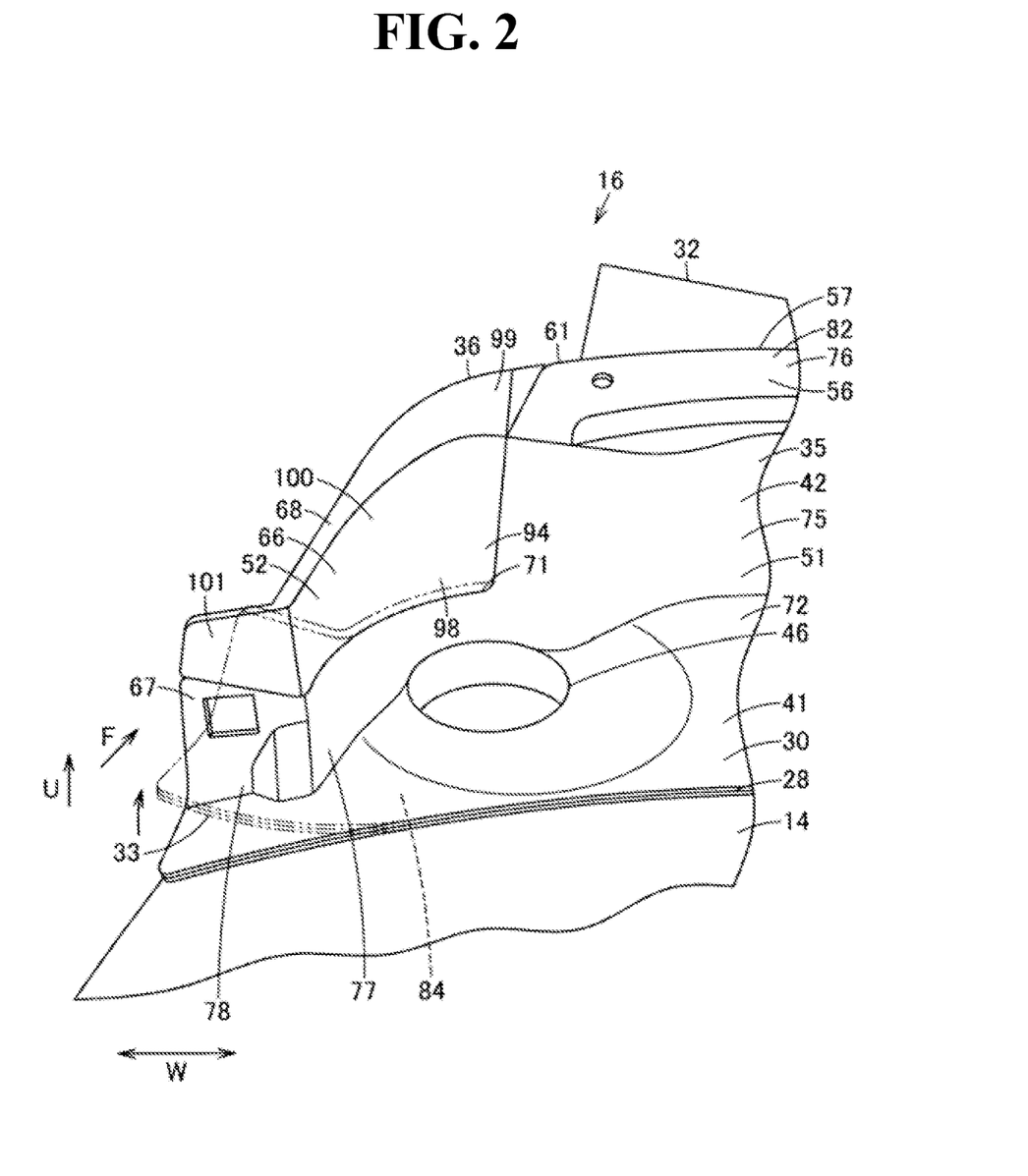
FIG. 2 is a perspective view showing a state in which divisional members of a part of the same cowl-top cover are mounted to each other.
Figure 3:
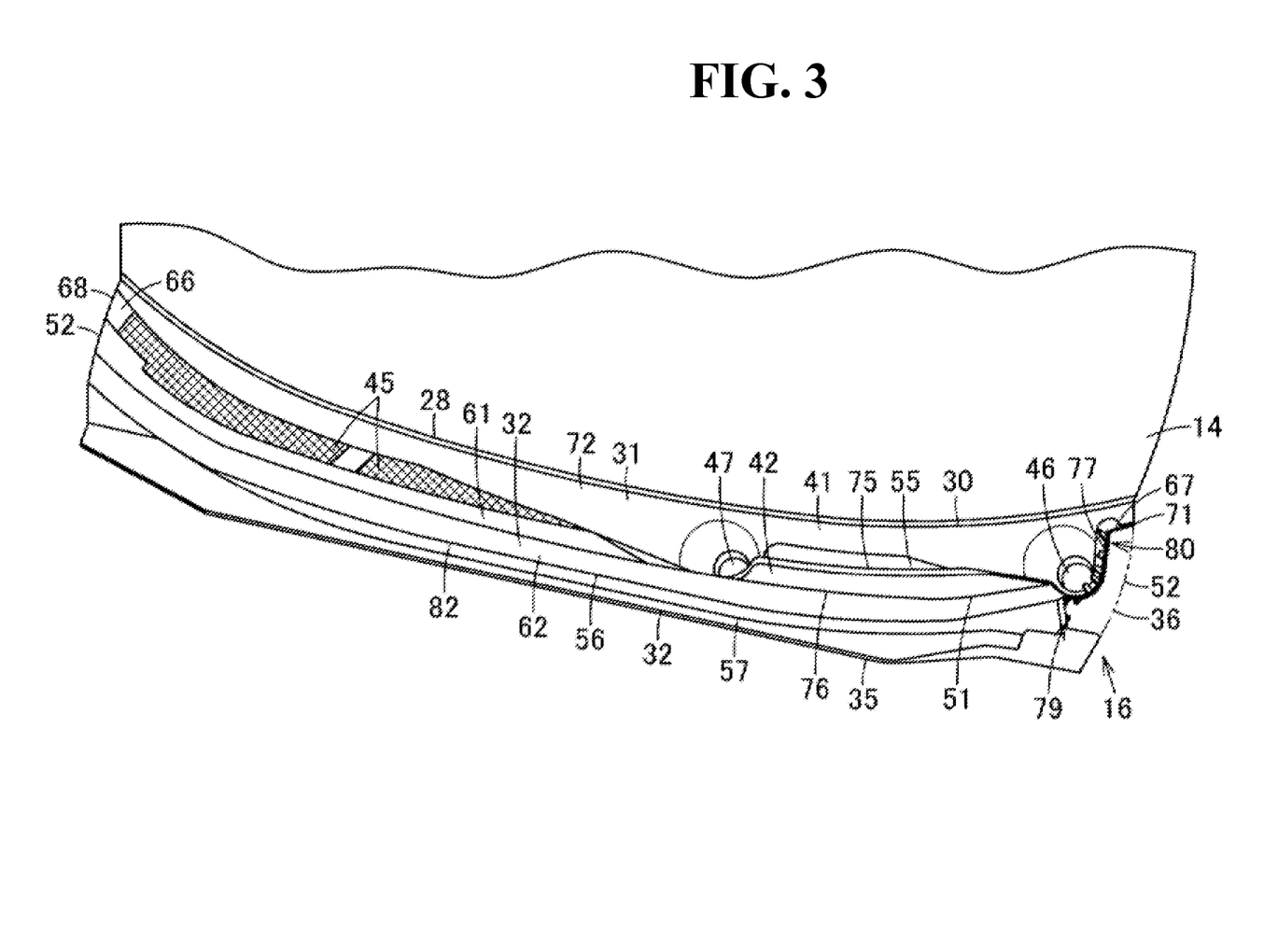
FIG. 3 is a perspective view showing a main body member of the same cowl-top cover.
Figure 4:
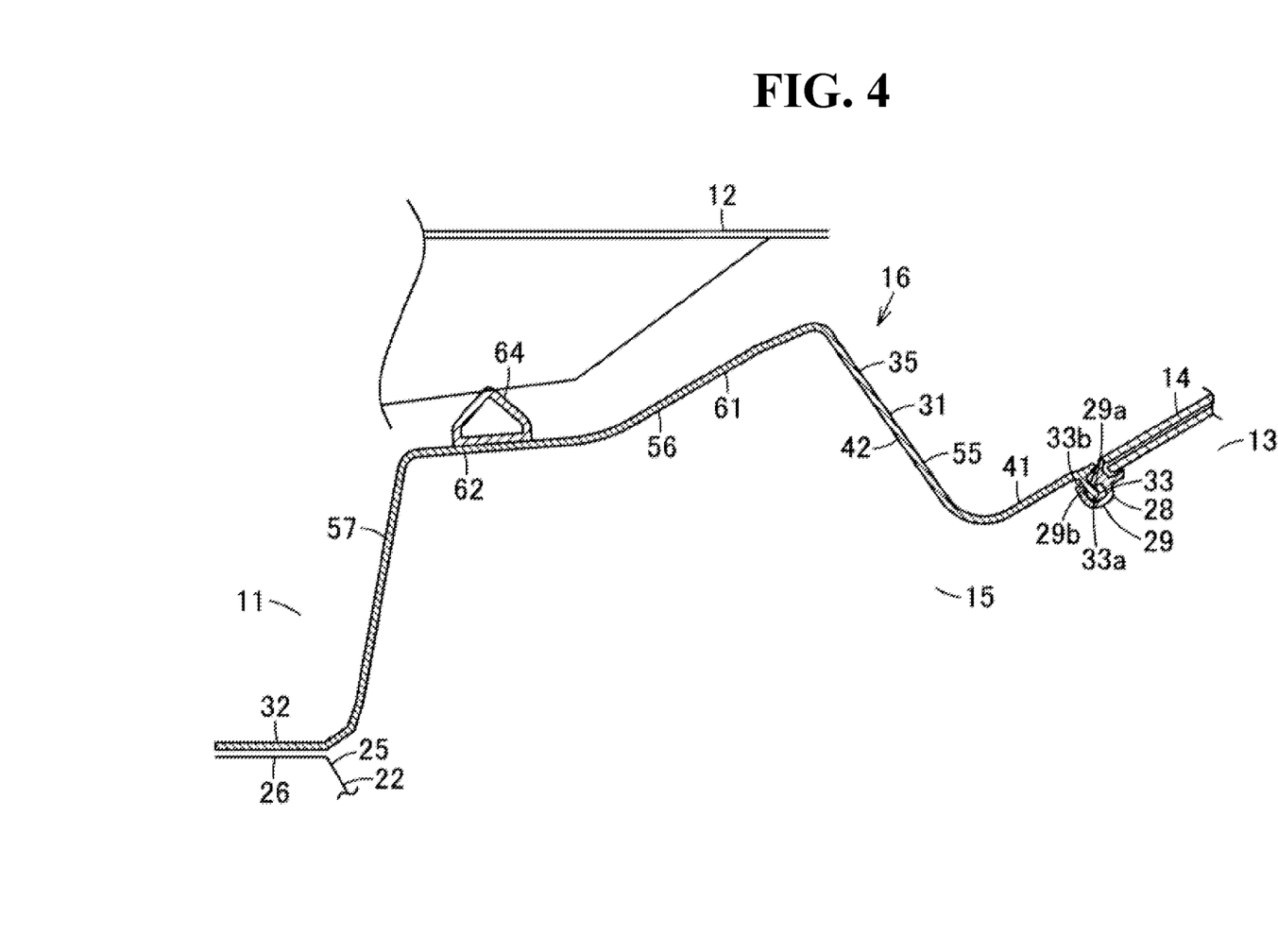
FIG. 4 is a sectional view in a state in which the same cowl-top cover is mounted.
Figure 5:
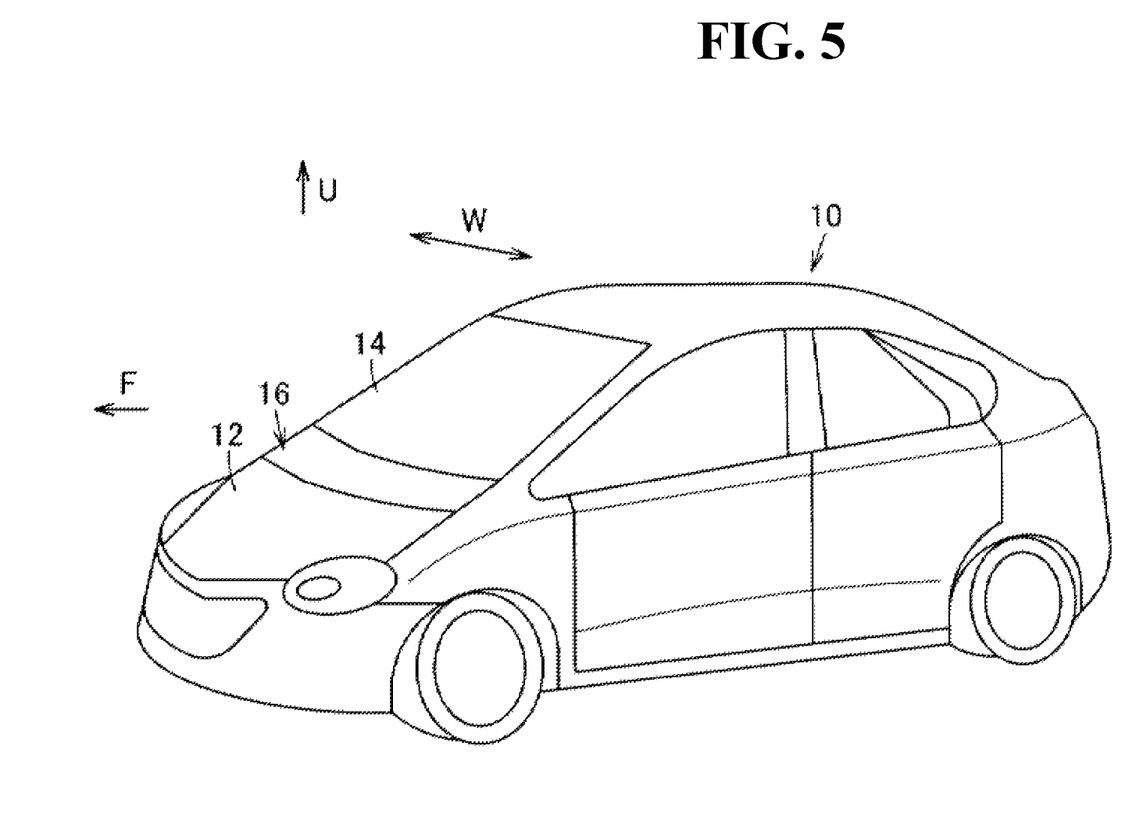
FIG. 5 is a perspective view showing a vehicle body to which the same cowl-top cover is mounted.

When this cowl-top cover 16 is mounted to the vehicle body 10, the tip end part 33a of the cover mounting portion 33 of a rear end part is inserted into and then engagingly fitted to the engagement receptacle portion 29 of the engagement member 28 at the front end part of the front glass 14, from an upper side, and then, the vehicle body mounting portion 32 at a front end lower part is placed on the support plate portion 26, and the mounting portion thus placed is fixed thereto by employing a fixing device. Also, in a state in which the hood 12 is closed, the hood seal 64 that is supported on the hood seal face portion 62 is deformed and comes into intimate contact with the hood 12 to thereby shut out a hot air or an offensive smell from the engine room 11 so as not to enter the vehicle room 13 through the air intake opening of the main body portion 31. It is to be noted that, although FIG. 4 shows a state in which the hood seal 64 is formed in the shape of a natural state in which the hood seal is not deformed, the hood seal 64 is established in a deformed state so as to be collapsed in the vertical direction in a state in which the hood 12 is closed.

On the other hand, when the cowl-top cover 16 is removed from the vehicle body 10, first, the auxiliary member 36 is removed from the main body member 35. That is, the fixing member that is inserted through a respective one of the mounting hole portions 105 of the auxiliary member 36 and a respective one of the mounting holes 88 of the main body portion 35 is removed and then the auxiliary member 36 is pulled out to an upper side with respect to the main body member 35. As a result, the opening portion 71 opens so that a low rigidity portion 84 on the rear side of the opening portion 71 of the main body member 35 is easily deformed in the vertical direction.

Also, a worker pinches this low rigidity portion 84 and then bends the pinched portion so as to plastically deform one end part in the longitudinal direction of the main body member 35 (the phantom line of FIG. 1 and FIG. 2), and then, one end part in the longitudinal direction of the cover mounting portion 33 is pulled out from the engagement receptacle portion 29. After that, while this pulled out portion is defined as a start point, the main body member 35 is sequentially bent to an upper side with respect to the other end part in the longitudinal direction, whereby the cover mounting portion 33 is continuously pulled out in a fastener manner from the engagement receptacle portion 29 to the other end part in the longitudinal direction and then the cowl-top cover 16 (the main body member) 35 is removed from the vehicle body 10.

Thus, according to the embodiment, the cover mounting portion 33 that is provided along the longitudinal direction from one end part in the longitudinal direction of the cover main body portion 30 is inserted into and then engaged with the engagement receptacle portion 29 that is disposed at the front edge part of the front glass 14, in a lower direction crossing a face of this front glass, whereby the cowl-top cover 16 is caused to be easily mountable to the vehicle body 10. In addition, the cover mounting portion 33 is caused to be easily deformable so as to be spaced to an upper side which is a counter-insertion direction with respect to the engagement receptacle portion 29 by way of the low rigidity portion 84 that is provided at one end part in the longitudinal direction of the cover main body portion 30, and by this deformation, the cover mounting portion 33 is caused to be easily removable from the engagement receptacle portion 29 at one end part in the longitudinal direction of the cover main body portion 30. Therefore, in so far as the cover mounting portion 33 is concerned, while a portion removed at one end part in the longitudinal direction of the cover main body portion 30 is defined as a start point, the cover main body portion 33 is deformed so as to be gradually pulled to an upper side with respect to the other end part in the longitudinal direction, whereby the cover mounting portion 33 is caused to be continuously removable from the engagement receptacle portion 29 along the longitudinal direction of the cover main body portion 30, and the cowl-top cover 16 is caused to be easily removable from the vehicle body 10.

As a result, the cowl-top cover 16 is caused to be easily mountable to or removed from the vehicle body 10.

In addition, the opening portion 71 in which the reverse V-shaped portion 42 is cut out at one end part in the longitudinal direction is provided in the main body member 35 configured to divide the cover main body portion 30 into a plurality of sections and thus the auxiliary member 36 that is mounted to this opening portion 71 is removed from the opening portion 71, whereby the position in proximity to the opening portion 71 of the main body member 35 can be obtained as an easily deformable low rigidity portion 84; and therefore, by way of this low rigidity portion 84, the cover mounting portion 33 of the main body member 35 is caused to be easily deformable so as to be spaced to an upper side which is the counter-insertion direction with respect to the engagement receptacle portion 29; the cover mounting portion 33 is caused to be more easily removable from the engagement receptacle portion 29; and the cowl-top cover 16 is caused to be more easily removable from the vehicle body 10.

In particular, the reverse V-shaped portion 42 configured to protrude to an upper side which is a thickness direction is configured to improve the rigidity of the cover main body portion 30; and thus, this reverse V-shaped portion 42 is cut out at one end part in the longitudinal direction of the cover main body portion 30 and then the opening portion 71 is formed, whereby the reverse V-shaped portion 42 for reinforcement can be eliminated from a position of one end part in the longitudinal direction of the cover main body portion 30. Therefore, the auxiliary member 36 is removed from the opening portion 71, whereby the low rigidity portion 84 can be easily constructed.

Further, one wiper pivot hole portion 46 is disposed adjacent to a lateral side of the opening portion 71, and thus, the rigidity of the low rigidity portion 84 is lowered more remarkably and then the low rigidity portion 84 is caused to be more easily deformable, and at the position of this low rigidity portion 84, the cover mounting portion 33 of the main body member 35 is caused to be easily deformable so as to be spaced to an upper side which is the counter-insertion direction with respect to the engagement receptacle portion 29, the cover mounting portion 33 is caused to be more easily removable from the engagement receptacle portion 29, and the cowl-top cover 16 is also caused to be more easily removable from the vehicle body 10.

Second Embodiment

Figure 6:
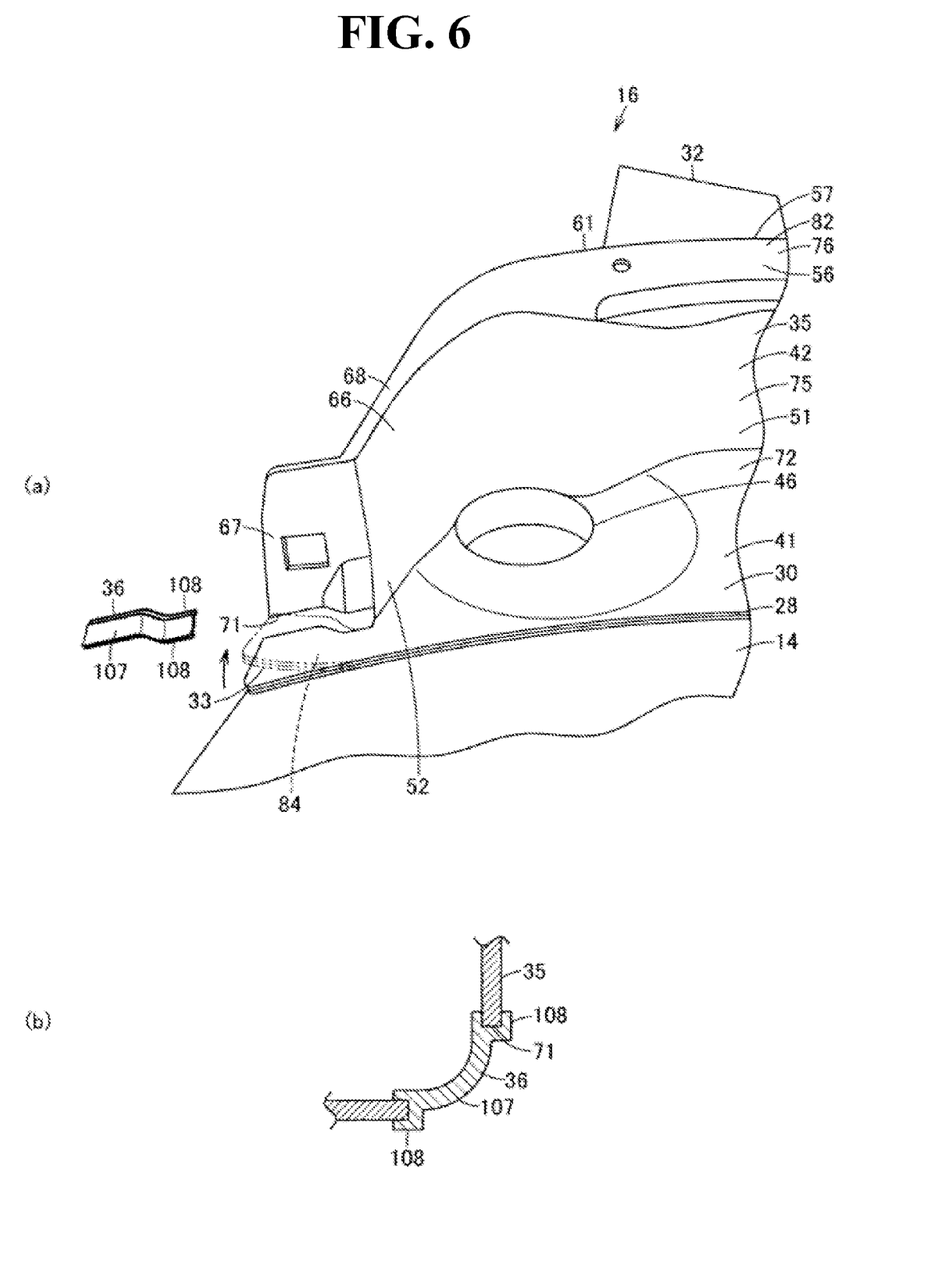

Next, a second embodiment will be described with reference to FIG. 6. It is to be noted that like constituent elements and functions of the first embodiment described above are designated by like reference numerals, and its related description is omitted.

According to the second embodiment, an opening portion 71 of a main body member 35 is cut out and formed in the shape of an elongated hole (in the shape of a slit) along a longitudinal direction at an end part in a longitudinal direction of a main body portion 31, and an auxiliary member 36 is detachable from this opening portion 71.

That is, the opening portion 71 is formed along a longitudinal direction of a cover main body portion 30 in proximity to a lower end part of a rear wall portion 67 of a transverse wall portion 52 of a reverse V-shaped portion 42, that is, along the proximity of a position which is continuous to a flat plate portion 41.

In addition, an auxiliary member 36 is integrally provided with: an auxiliary member main body 107 which is a subsidiary rear wall portion formed in a longitudinal manner to engage with the opening portion 71 and constituting the proximity of the lower end part of the rear wall portion 67 of the transverse wall portion 52 of the reverse V-shaped portion 42; and cross-sectional U-shaped, retaining receptacle portions 108 which are respectively provided along both side parts in the longitudinal direction of this auxiliary member main body 107. Also, these retaining receptacle portions 108 are respectively engagingly locked to front and rear edge parts of the opening portion 71, whereby the auxiliary member 36 closes the opening portion 71 and then is mounted and fixed to the main body member 35.

In addition, in this case also, by removing the auxiliary member 36 from the opening portion 71, one end part in the longitudinal direction of the flat plate portion 41 at a rear part of this opening portion 71 is obtained as an elongated plate-shaped low rigidity portion 84, and therefore, by way of this low rigidity portion 84, a cover mounting portion 33 of the main body member 35 is caused to be easily deformable so as to be spaced to an upper side which is a counter-insertion direction with respect to an engagement receptacle portion 29; the cover mounting portion 33 is caused to be more easily removable from the engagement receptacle portion 29; the cowl-top cover 16 is caused to more easily removable from a vehicle body 10, etc., and there can be attained functions and advantageous effects which are similar to those in the first embodiment described above.

It is to be noted that in a respective one of the embodiments described above, the auxiliary member 36 may be formed of a member which is softer in material than the main body member 35, such as a plastically deformable synthetic resin having a flexibility such as a rubber, for example. In this case, even while the auxiliary member 36 is mounted to the opening portion 71 of the main body member 35, a rear side of the opening portion 71 at one end part in the longitudinal direction of the cover main body portion 30 can be obtained as a low rigidity portion 84, and by way of this low rigidity portion 84, the cover main body portion 30 is caused to be plastically deformable so as to space the cover mounting portion 33 to an upper side which is the counter-insertion direction of the engagement receptacle portion 29; and therefore, there can be attained functions and advantageous effects which are similar to those in a respective one of the embodiments described above. That is, by way of the auxiliary member 36, the low rigidity portion 84 can be easily constructed at a position in proximity to the opening portion 71. Therefore, in this case, the auxiliary member 36 does not need to be mountable to and removable from the opening portion 71, and the auxiliary member 36 may be fixed to the main body member 35 by way of adhesive bonding instead of providing an engagingly locking protrusion portion 91 or the like at the main body member 35.

In addition, although the cover main body portion 30 has been divided into two divisional members, this main body portion may be divided into three or more divisional members as long as it includes: a divisional member having the opening portion 71 and constituting at least part of a remaining portion of the cover mounting portion 33 and the reverse V-shaped portion 42; and a divisional member which is mounted to the opening portion 71 to thereby constitute at least a part of the reverse V-shaped portion 42.

Third Embodiment

Figure 7:
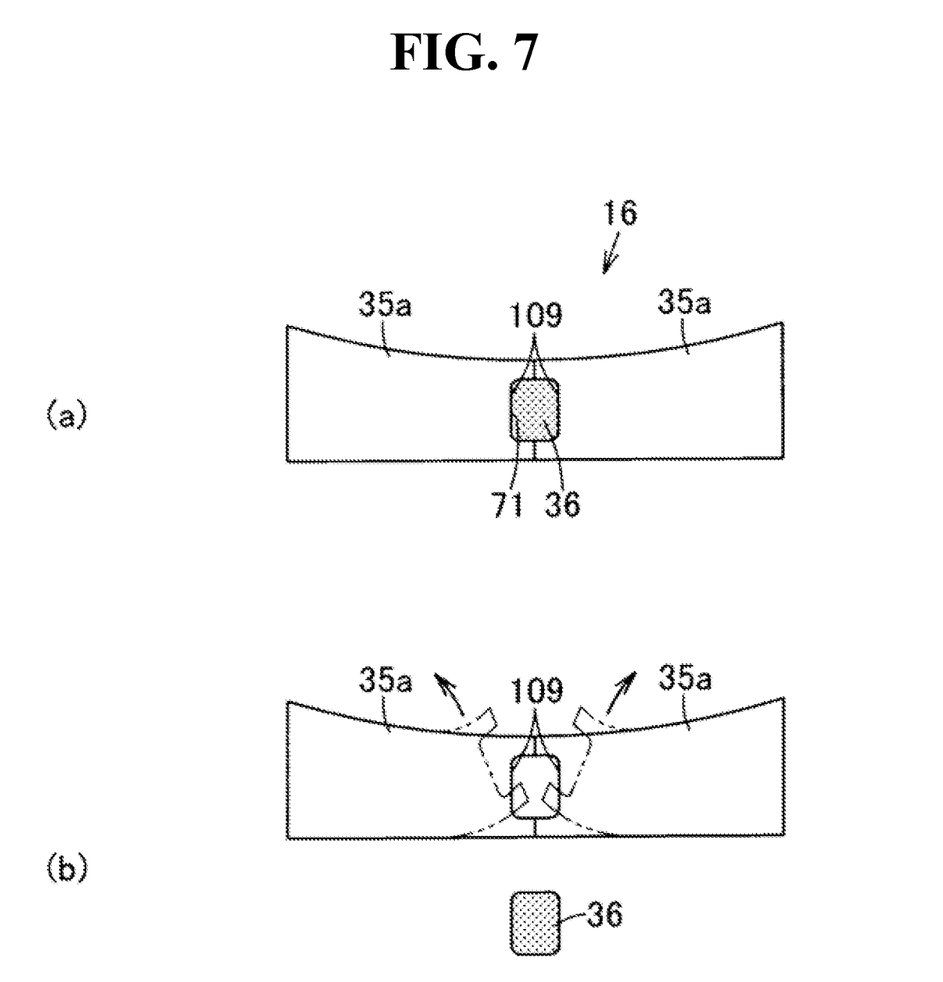

Next, a third embodiment will be described with reference to FIG. 7. Although the main body member 35 according to a respective one of the first and second embodiment described above has been formed in the shape of one elongated substantial plate covering the cowl portion 15 all over the substantially widthwise direction of the vehicle 10, this main body portion is not limitative thereto, and may be formed so as to be divided into a plurality of main body members 35a, 35a such as two left and right members each having a length which is half of that in the substantially widthwise direction of the vehicle 10, for example, as is the case with the third embodiment as shown in FIG. 7. In this case, at least either one of abutment portions of the main body portions 35a, 35a that are adjacent to each other, for example, cutout portions 109, 109 which are respectively cut out are provided in the embodiment, and these cutout portions 109, 109 are configured to form the opening portion 71 when the main body members 35a, 35a are caused to abut against each other, whereby the auxiliary member 36 may be removably mounted to this opening portion 71.

Also, at the time of removing the cowl-top cover 16, by removing the auxiliary member 36 from the opening portion 71 and then removing the main body member 35a in which an easily removable cutout portion 109, for example, is provided (in the embodiment, it is sufficient if either one of the main body members 35a be removed), an approximate halve of the cowl portion 15 opens, and through this opened portion, the other main body member 35a is lifted by laying one hand on the member, whereby the other main body member 35a can be removed. That is, when the elongated cowl-top cover 16 is removed, this cowl-top cover can be removed on a half by half basis of its longitudinal dimensions (by longitudinal dimensions divided in plurality), and a removing workability is improved.

In addition, in the third embodiment described above, the opening portion 71 may be provided at an end part (on the side of a fender panel) of at least either the left or right end part of a respective one of the main body members 35a, 35a.

Further, in a respective one of the embodiments described above, the cowl-top cover 16 can be provided at a portion other than a front part of the vehicle body 10, for example, between a rear glass serving as a wind shield and a rear trunk hood, etc.

INDUSTRIAL APPLICABILITY

The present invention can be applied to a cowl-top cover which is disposed between a front glass and a bonnet/hood of a motor vehicle, for example.

What is claimed is:

1. A cowl-top cover comprising
a cover main body portion disposed at an edge part of a wind shield, a widthwise direction of a vehicle is defined as a longitudinal direction thereof, wherein
the cover main body portion comprises:
an engagement portion which is disposed along a longitudinal direction from one end part of the cover main body portion in the longitudinal direction, the engagement portion being inserted into and engaged with an engagement receptacle portion which is disposed at the end part of the wind shield, in a direction crossing a face of the wind shield; and
a low rigidity portion which is provided at said one end part of the cover main body portion along the longitudinal direction, the low rigidity portion being easily deformable in a direction away from the engagement portion so as to space the engagement portion in a counter-insertion direction with respect to the engagement receptacle portion.

2. The cowl-top cover according to claim 1, wherein
the cover main body portion comprises a protrusion portion which is provided in proximity to the engagement portion at least at one end part in the longitudinal direction, the protrusion portion being configured to protrude to an upper side, and is divided into a plurality divisional members,
the plurality of divisional members includes a first divisional member and a second divisional member,
the first divisional member has an opening portion which is formed by cutting out at least the protrusion portion at the one end part of the cover main body portion in a longitudinal direction, and constitutes at least a part of a remaining portion of the engagement portion and the protrusion portion, and
the second divisional member is mounted to the opening portion to thereby constitute at least a part of the protrusion portion.

3. The cowl-top cover according to claim 2, wherein
the second divisional member is detachable from the opening portion of the first divisional member.

4. The cowl-top cover according to claim 2, wherein
the second divisional member is made of a member which is softer in material than the first divisional member.

* * * * *